US006091771A

United States Patent [19]

Seeley et al.

[11] Patent Number: 6,091,771
[45] Date of Patent: Jul. 18, 2000

[54] WORKSTATION FOR VIDEO SECURITY SYSTEM

[75] Inventors: John E. Seeley, County of Bucks, Pa.; William R. Vogt, County of Morris, N.J.

[73] Assignee: Wells Fargo Alarm Services, Inc., King of Prussia, Pa.

[21] Appl. No.: 08/904,947

[22] Filed: Aug. 1, 1997

[51] Int. Cl.$^7$ .................................................. H04N 7/18
[52] U.S. Cl. ........................ 375/240; 345/378; 348/153; 348/154
[58] Field of Search ............................ 375/240; 348/143, 348/152, 153, 154, 155, 159, 390; 345/378; H04N 7/18

[56] References Cited

U.S. PATENT DOCUMENTS

| | | |
|---|---|---|
| 3,641,266 | 2/1972 | Stults et al. . |
| 3,740,466 | 6/1973 | Marshall et al. . |
| 4,630,110 | 12/1986 | Cotton et al. . |
| 4,943,854 | 7/1990 | Shiota et al. . |
| 4,962,473 | 10/1990 | Crain . |
| 5,040,067 | 8/1991 | Yamazaki . |
| 5,075,884 | 12/1991 | Sherman et al. . |
| 5,109,278 | 4/1992 | Erickson et al. . |
| 5,111,291 | 5/1992 | Erickson et al. . |
| 5,202,759 | 4/1993 | Laycock . |
| 5,229,850 | 7/1993 | Toyoshima ............................... 348/153 |
| 5,258,837 | 11/1993 | Gormley . |
| 5,315,711 | 5/1994 | Barone et al. . |
| 5,400,011 | 3/1995 | Sutton . |
| 5,448,290 | 9/1995 | VanZeeland . |
| 5,491,511 | 2/1996 | Odle . |
| 5,508,736 | 4/1996 | Cooper . |
| 5,521,634 | 5/1996 | McGary ................................... 348/169 |
| 5,581,297 | 12/1996 | Koz et al. . |
| 5,615,017 | 3/1997 | Choi ......................................... 386/109 |
| 5,625,572 | 4/1997 | Yonekura et al. . |
| 5,629,981 | 5/1997 | Nerlikar . |
| 5,649,032 | 7/1997 | Burt et al. . |
| 5,666,157 | 9/1997 | Aviv ......................................... 348/152 |
| 5,819,261 | 10/1998 | Takahashi et al. .......................... 707/3 |
| 5,825,432 | 10/1998 | Yonezawa ................................ 348/563 |
| 5,870,471 | 2/1999 | Wootton et al. ........................... 380/10 |
| 5,895,453 | 4/1999 | Cook ......................................... 705/22 |
| 5,923,364 | 7/1999 | Rhodes et al. ........................... 348/159 |
| 5,926,209 | 7/1999 | Glatt ......................................... 348/143 |
| 5,937,092 | 8/1999 | Wootton et al. .......................... 382/192 |
| 5,956,424 | 9/1999 | Wootton et al. .......................... 382/192 |

*Primary Examiner*—Howard Britton
*Attorney, Agent, or Firm*—Polster, Lieder, Woodruff, & Lucchesi, LC

[57] ABSTRACT

A workstation (106) for a security system (10) includes a first video display (602a) displaying status information of video equipment (22) used at the premises to perform the surveillance. A second video display (602b) displays a plurality of thumbnail images of an intrusion scene. A third video display (602c) displays a snapshot image from which one of said the thumbnail images is derived. The snapshot is displayed upon the thumbnail image derived from the snapshot being selected by a workstation operator. A fourth video display (602d) displays data relating to the premises, identifying the location on the premises where the intrusion occurred, who should be contacted about the intrusion, etc.

16 Claims, 9 Drawing Sheets

WORKSTATION FOR VIDEO SECURITY SYSTEM

CROSS-REFERENCE TO RELATED APPLICATIONS

The subject matter contained in this application is related to U.S. patent application Ser. No. 08/772,731, now U.S. Pat. No. 5,956,424, "Low False Alarm Rate Detection for Video Image Processing Based Security Systems," filed Dec. 23, 1996; U.S. patent application Ser. No. 08/757,838, now U.S. Pat. No. 5,870,471, "Authentication Algorithms for Video Images," filed Nov. 27, 1996; U.S. patent application Ser. No. 08/771,991 "Reduction in False Alarms of Image Processing Based Security Systems by Performing Classification of Objects Detected," filed Dec. 23, 1996; and U.S. patent application Ser. No. 08/772,595, now U.S. Pat. No. 5,937,092, "Rejection of Light Intrusion False Alarms in Video Security Systems," filed Dec. 23, 1996.

STATEMENT REGARDING FEDERALLY SPONSORED RESEARCH OR DEVELOPMENT

Not applicable.

BACKGROUND OF THE INVENTION

This invention relates to a video security system for monitoring a number of premises simultaneously; and, more particularly, to a work station for such a system by which information (video, audio, and data) can be displayed for a system operator responsible for alerting authorities of an intrusion at a premises and who relies on the displayed information in determining whether or not authorities are notified.

Previously, security systems protected a building using make/break contacts strategically placed at doors, windows, and other potential entry points. When a contact is broken and an alarm is sounded or relayed to a central control station located within the building, nearby to the building, or remotely to a central control station of the security company. Besides make/break sensors, security companies used P.I.R. (passive infra red) sensors which sense heat differences caused by animate objects such as humans or animals, vibration sensors which, when placed upon a window for example, detect when the window is broken, and microwave sensors. As with the make/break sensors, when any one of the sensors indicates a detection, a system alarm is indicated. The alarm is also given if an alarm unit in the building to which the sensors are connected senses that the path to a sensor is interrupted or broken.

With these alarm systems, all the receiver of an alarm knew was that an alarm had occurred. The system operator had no other knowledge by which he can determine if an alarm signals the presence of a real intruder, or if it was a false or unwanted alarm. Because sensors were notorious for going off during inclement weather (they are sensitive to large electromagnetic fields such as will occur during lightning conditions, etc.), or were triggered by the presence of animals, etc., the resulting false or unwanted alarms detrimentally effected the efficiency and operation of the security system.

While the situation was annoying when a false or unwanted alarm was relayed to a local monitoring station, the situation became even worse when the alarm was to a security company's remote central station. Here, operators had to use their experience of the particular circumstances surrounding the alarm (i.e., local weather conditions, past occurrences at that particular site, etc.), to determine whether or not the alarm is real. If their knowledge and experience told them the alarm signified an actual intrusion, they had to relay the alarm to the local police for that site so the police can conduct a further investigation.

There are numerous examples of an alarm system either not working, or being rendered ineffective, because of the number of false or unwanted alarms to which authorities had to react. Once the authorities refused to investigate reported alarms for a premises, the premises was essentially not protected. Over the years, situations resulting from false and unwanted alarms have continued to worsen. Now, police often require confirmation or evidence of an intrusion before investigating, or else they will give priority to those situations where they have greater certainty an intrusion has occurred. Security system companies first addressed this issue by providing an audio (or "listening-in") capability to the system. This enabled the monitor to hear actual movement on the premise (the sound of voices, glass breaking, cabinets or drawers being opened, etc.), with this information also being relayed to the authorities. Now, the security industry has begun to extensively use video cameras to constantly monitor premises. While this solves certain of the problems discussed above, new problems have arisen. One shortcoming of camera surveillance is the need for a continuously connected communication channel for the sensor (camera), with an operator having to must continuously monitor the video. Some systems have attempted to combine video with another sensing mechanism, P.I.R., for example, so that actuation of the video is controlled by the other sensor first sensing the presence of an intruder. To further control costs, the cameras are often slow scan cameras whose output is compressed onto POTS (plain old telephone system) lines (typically using 28.8k modems) with transmission rates of 1 frame of video over a 1–5 second interval.

At the monitoring site, an operator now has two problems to confront. First, because the frame rate is slow, what the operator sees is not what is necessarily occurring at that moment. But, more importantly, most of the time the operator will see nothing at all out of the ordinary. Yet, the operator must maintain a constant vigilance. This is a serious problem because it has been estimated that after watching a security system camera observing an unchanging scene for as little as 5 minutes, an operator's performance diminishes rapidly to the point where the operator is essentially ineffective after 30 minutes. One result of this, of course, is that unwanted alarms still occur. So, up until now, the only real advantage video monitoring offered was that should an intrusion occur and should the operator notice it, then the relayed information sent to the local police got high priority because of the certainty of the situation.

The video security system of the present invention overcomes these problems in part by providing a system operator live images of an intrusion, not causing him to waste his time of "crying wolf" because of false and unwanted alarms, and by providing a level of surveillance not obtainable even using guards on site. It is now possible, as described hereinafter, to relay definitive information to the local police of an intrusion, as well as capture, maintain, and transmit images of the intrusion to the police or other authorities. It is also possible to eliminate false alarms, regardless of their causes.

In co-pending U.S. patent application Ser. Nos. 08/772,731; 08/757,838; 08/771,991; and 08/772,595; the teachings of which are incorporated herein by reference, there is described a system and method for continuously viewing a scene to detect the presence of an intruder with a very low probability of false alarms and with a high probability of detection; authenticating an image of the intrusion, and relaying the authenticated image from the protected site to a monitoring site. The ability to determine, at the monitoring site, whether or not an intrusion has occurred, now removes from the human operator of the system the initial responsibility of determining whether an intrusion results from a new human presence, or otherwise. This, in turn, eliminates the need for the human operator to continuously monitor all of the cameras on the premises of the sites being protected. Also, because detection and recognition for each premises is conducted on-site at that premises, there is no need for a continuous communication path between the premises and a central station of the system. When a path is established, high frame rate and high quality video is transferred from the site to the operator so the operator can evaluate the video and concur with the evaluation an intrusion has occurred. Further, once an intrusion is detected, high resolution samples ("snapshots") of the video are taken and supplied to the alarm system operator at the central station. These samples are transferred using lossless compression techniques and are authenticated for later admittance into court for prosecution purposes. What is now required is a workstation at which an operator can timely display images of an intrusion, live images of the scene of the intrusion, audio from the scene, as well as pertinent data about the premises. This latter might include a history of previous intrusions, monitoring history for the premises, and other significant information.

BRIEF SUMMARY OF THE INVENTION

Among the several objects of the present invention may be noted the provision of a security system for continuously and reliably monitoring one or a number of premises. If more than premises is being monitored, the system enables all of the premises to be simultaneously monitored from a central station, even premises which are remote from each other and the central station. For this purpose, the system incorporates automated video surveillance of a premises and intelligent image processing to filter out false and unwanted alarms while reliably detecting any intrusions.

Another object of the invention is a security system having a workstation at which video, audio, and relevant data about a premises is conveniently displayed for a system operator. The workstation enables the operator to determine not only what is displayed, but the manner in which it is displayed. Processed video images including thumbnails of the premises obtained from any of a plurality of cameras strategically located about a facility, both inside and out can be displayed. The workstation further allows the thumbnails to be arranged in any pattern (mosaic) desired by the operator and the operator can have all, or only certain images displayed. Further, live video can be shown to the operator.

Another object of the invention is a workstation connected to a video server (VS) at the central location to and through which video signals from all the monitored premises are routed to the workstation. The VS receives, logs, and stores all of the video transmitted to the central station (including live video), and provides the video to whichever of a plurality of workstations at the central station is available for use by an operator to view the video and any associated data relating to the site at which a reported intrusion has occurred. The workstation also operates in conjunction with a central alarm computer (CAC) to which an alarm from a site is reported and at which the intrusion site is identified.

A further object of the invention is a workstation which allows operators to work quickly and efficiently even though a large number of premises are monitored from a central station where the workstations are located. Because the security system only reports actual intrusions, an operator's time is not wasted on viewing a video monitor on which the image will be generally unwavering the great majority of the time. Thus, fewer operators can monitor more sites than heretofore has been possible.

In accordance with the invention, generally stated, a video security system monitors a plurality of separate premises from a central station. Each site has an image processor acquiring and processing visual images of locations about the premises. Motion by an intruder, detected by the image processor, produces an alarm input to an alarm unit which facilitates the transmission of authenticated snapshots of the scene, compressed video, and audio to the central station. A video processor at the central station receives and stores these inputs and in conjunction with a central alarm computer makes the transmitted signals available to a system operator at one of a plurality of workstations located at the central station. The operator, after viewing the transmissions, can, if the intrusion is verified, alert appropriate authorities to investigate the premises. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
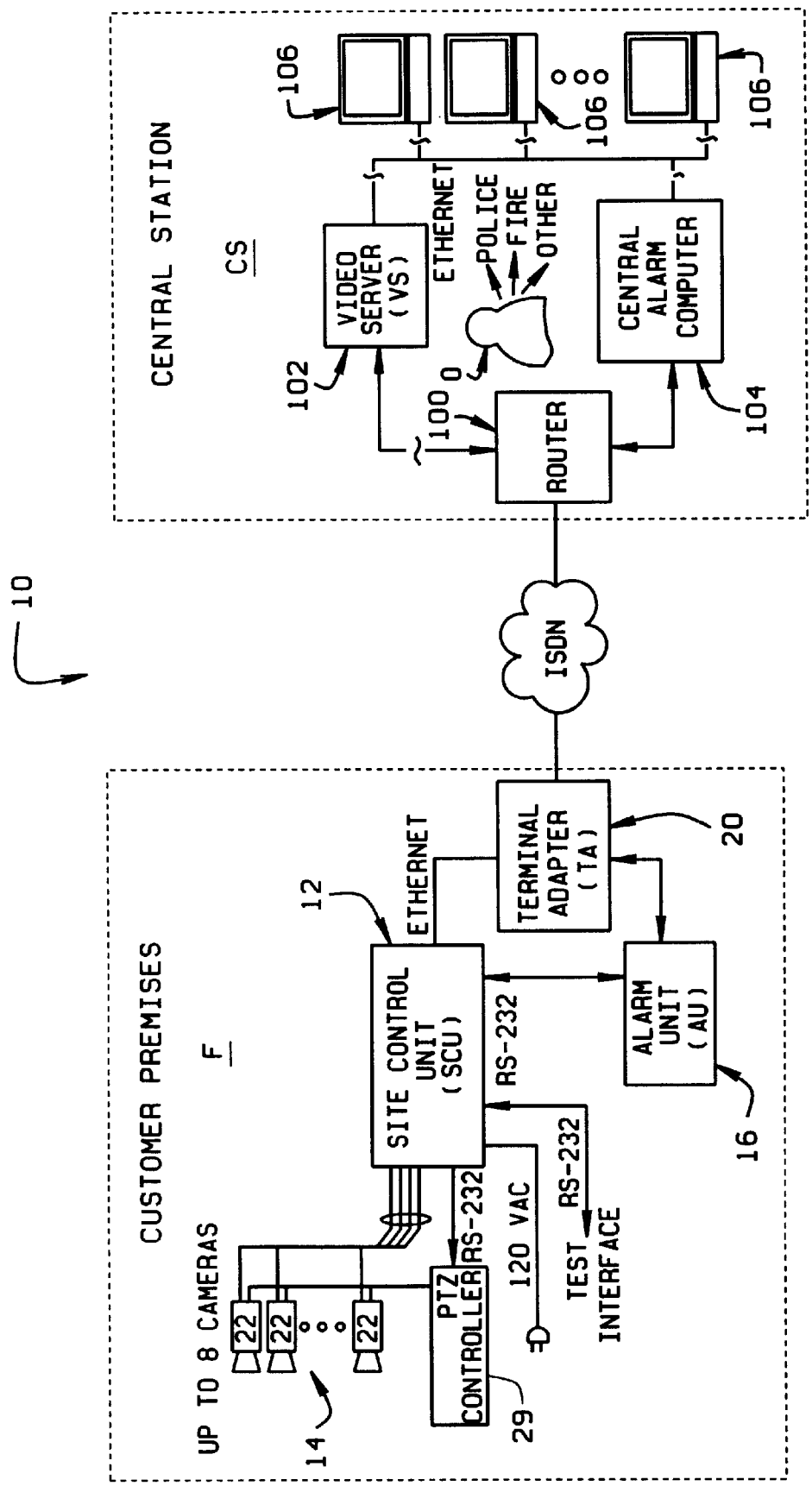
FIG. 1 is a block diagram of a video security system.

Referring to the drawings, an alarm or video security system 10 shown in FIG. 1 includes a site control unit (SCU) 12 which is physically located at an installation or facility F being monitored by the system. The SCU has an associated imaging means 14 and operation of the SCU and the imaging means is more fully described in co-pending application Ser. No. 08/904,510. An output from the SCU is directed to an alarm unit (AU) 16 whose operation is more fully described in co-pending application Ser. No. 08/904,949. The SCU provides an output to a central station CS via a terminal adapter (TA) 20. Operation of the terminal adapter is more fully described in co-pending application Ser. No. 08/904,913. An operator O monitors the facility from the central station and the information (images, audio, data) provided him or her by the SCU. The operator evaluates this information and, when necessary, informs police, fire, medical, or other authorities of a condition detected at the facility where SCU 12 is located. At the central station, a router 100, video server (VS) 102, and a central alarm computer (CAC) 104, are interconnected with a plurality of workstations (WS) 106 to display video images and other information to the operator to assist the operator in determining whether the intrusion requires alerting the authorities. Operation of the central alarm computer is more fully described in co-pending application Ser. No. 08/904,948. Although operation of various of the alarm system components are described in the referenced co-pending applications, whose teachings are incorporated herein by reference, a general description of these components in included herein to assist the reader in understanding the operation of the security system 10.

In previous security systems, a fundamental cause of false and unwanted alarms has been the sensors and methodology used to ascertain if an intrusion has occurred. As described in the above referenced co-pending application Ser. Nos. 08/772,731, 08/757,838, 08/771,991, and 08/772,595, use of appropriate processing methodology accounts for various effects which could otherwise trigger false alarms, so only a life form intruding into a scene produces an alarm. By quickly and efficiently differentiating between human motion and non-human (animal) motion, the monitoring task of the operator is simplified with intrusions resulting from human actions causing an alarm, but with false and unwanted alarms resulting from the presence of animals not being given.

Figure 2:
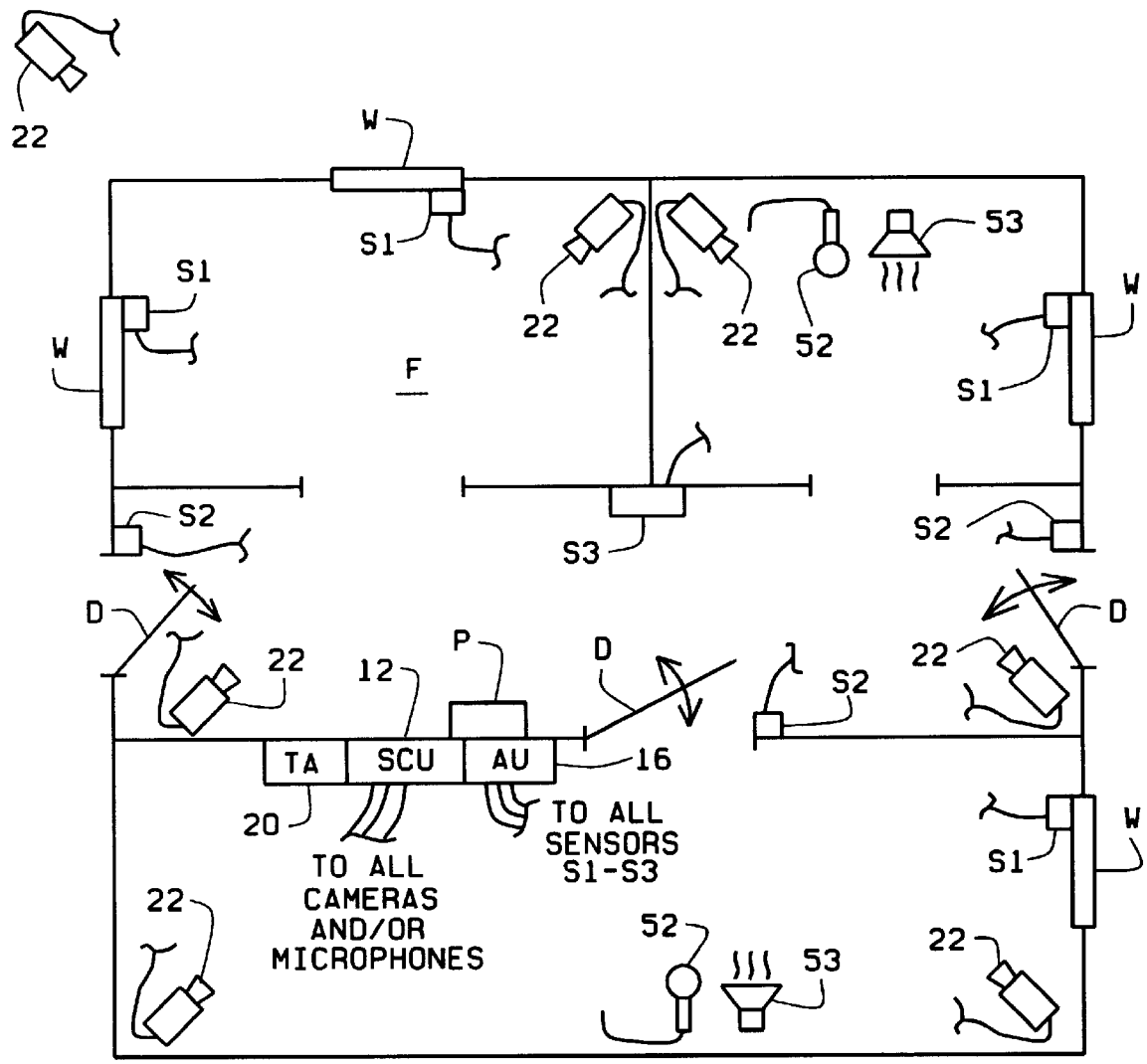
FIG. 2 is a representation of a facility in which a site control unit, alarm unit, and terminal adapter of the security system are installed.
Figure 2:
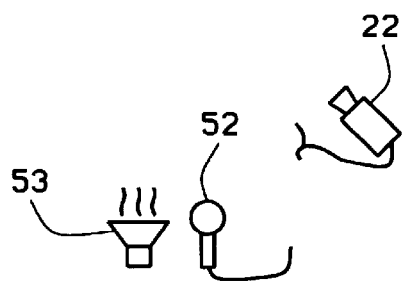
Figure 3:
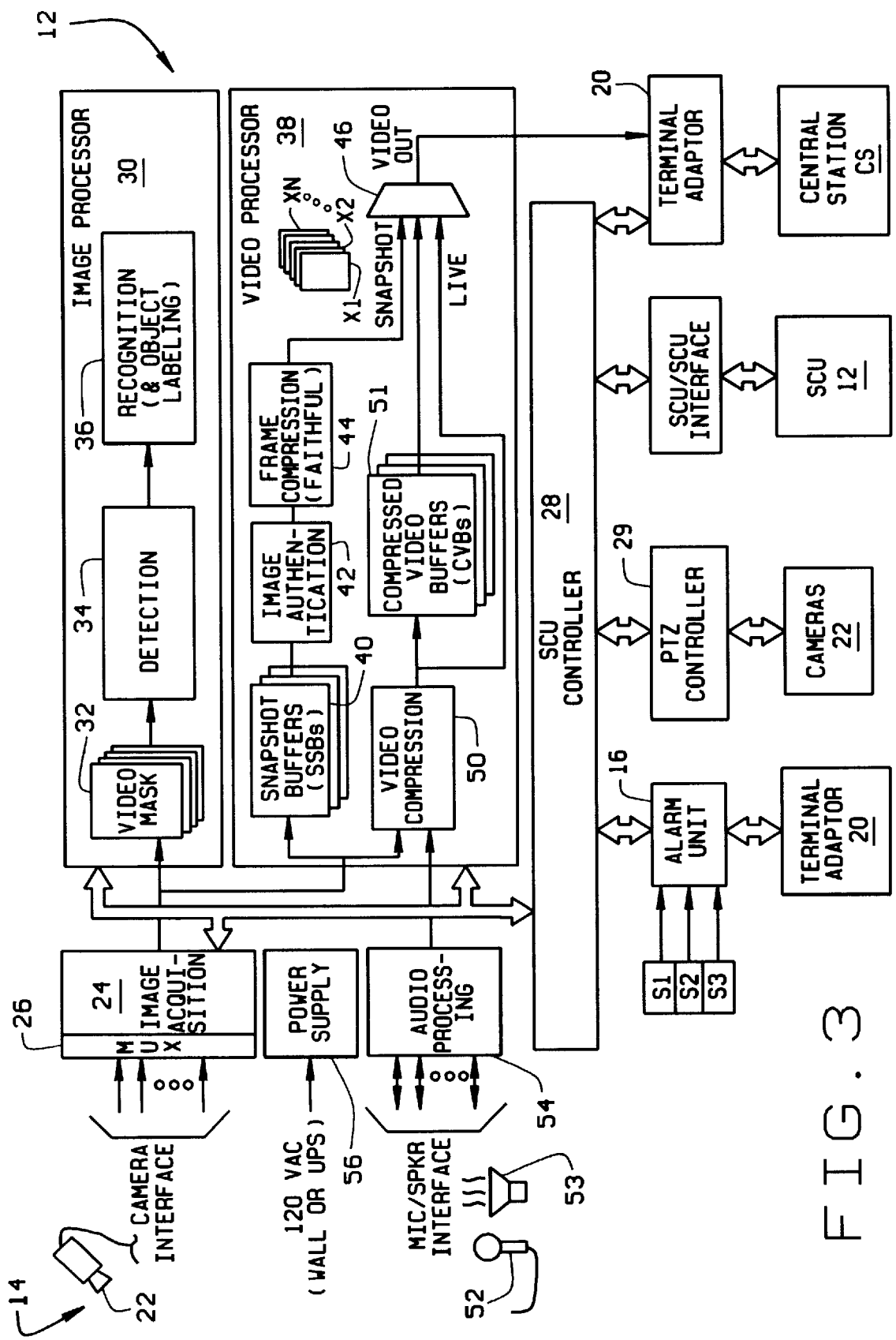
FIG. 3 is a block diagram of a sight control unit installed on a premises.
Figure 6:
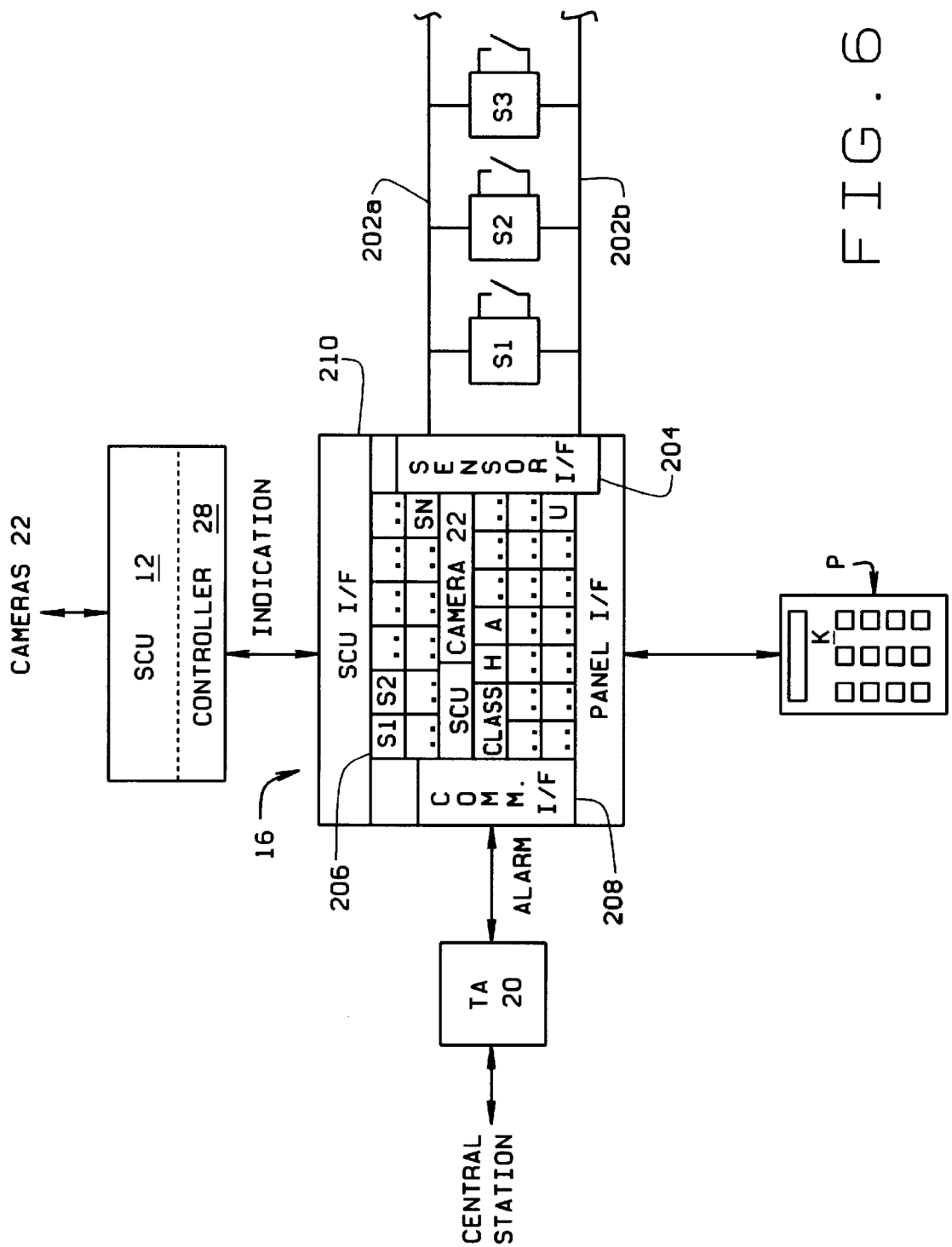
FIG. 6 is a block diagram of an alarm unit of the security system.

Referring to FIG. 2, facility F is representative of the type of location with which security system 10 is used. That is, the facility has windows W and doors D. The windows may, for example, be provided with sensors S1 and each of the doors with a sensor S2. Both sensors S1 and S2 may be conventional make/break sensors, although sensor S1 may be a vibration sensor. A motion sensor S3 is installed in a passage through the facility to detect someone moving through the passage. Sensors S1–S3 are all well-known in the art. The SCU 12, AU 16, and TA 20 are preferably located on the premises. A plurality of video cameras are 22 strategically located both inside and outside the facility. Outputs from the cameras 22 are routed to the SCU which, in turn, is connected to AU 16 of the alarm system also located at the site, as is TA 20. The window and door sensors S1, S2, and motion sensor S3 are connected to the alarm unit as shown in FIG. 6. The SCU intelligently looks at video provided by each of the cameras to determine if an intruder is present within any of the scenes viewed by the cameras. If motion is detected, and the SCU confirms that the cause of the motion is from a source which is one of a predetermined class of causes, then the SCU sends an indication to AU 16, which generates an alarm and establishes, in conjunction with TA 20, a video communications channel between the SCU and the central station. The operator now does not have to continuously monitor unchanging video with which there is a low probability of an intruder presence. Rather, because the AU does not generate an alarm unless it is informed of a confirmed intrusion, the operator need only view video provided to him or her at that time. This allows the operator to readily monitor many premises from the central station, even though these premises are widely separated from one another, secure in the knowledge that an intrusion will not be missed. After viewing video images (snapshots) obtained from the viewing the scene where the intrusion is detected, if the operator confirms an intruder's presence, the operator relays this information to investigating authorities. Further, the operator can provide the authorities with an accurate assessment of the situation at the facility so they can take the necessary precautions based upon the number of intruders, their ages, whether or not they are armed, etc.

An image acquisition section 24 of the SCU receives video signals from each camera 22, these signals representing images of the scene observed by the respective camera. Module 24 includes one or more multiplexers (MUX) 26. The cameras 22 are preferably television cameras, and may be black and white cameras, color cameras, or a combination of both. A controller section 28 of the SCU responds to commands from the central station, through TA 20 and AU 16, to operate the cameras. For example, if the AU receives an alarm input from one of the sensors S1–S3 it monitors, it sends a command signal to the SCU to turn "on" a camera 22 to obtain a visual image of the area where the sensor is located. The SCU also receives commands transmitted through TA 20 by the system operator to turn cameras "on" and "off". The cameras are connected to a pan, tilt, and zoom (PTZ) controller 29 and controller 28 utilizes the pan, tilt, and zoom capabilities of the cameras, as appropriate, to obtain the best possible images for processing.

Figure 4A:
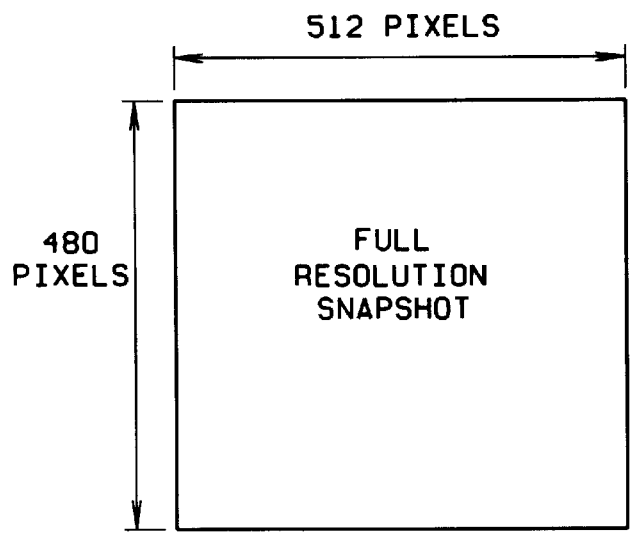
FIG. 4A represents a full frame of video (snapshot) obtained from a camera, and FIG. 4B a compressed frame (thumbnail) of video.
Figure 5:
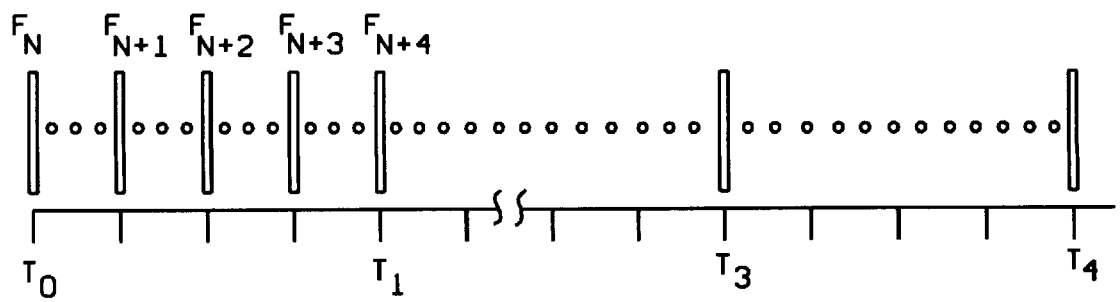
FIG. 5 is a representation of a time line to illustrate the frame rate at which images are acquired by the imaging system of the site control unit, and at which snapshots can be provided by the site control unit to an alarm system operator.

Video signals from the cameras are provided as inputs into an image processor 30 of the SCU which sequentially processes an image from each camera 22, and compares that image with a prior stored image from the same camera. This stored image is continually updated. Processor 30 incorporates those algorithms and processing methodology described in co-pending application Ser. Nos. 08/772,731, 08/771,991, and 08/772,595, to analyze the contents of the images represented by these signals to determine the presence of an intrusion. Processor 30 includes a video masking section 32, a detection section 34, and an object recognition and labeling (classification) section 36. a camera as caused by an intruder on the premises. When an intruder is detected, SCU 12 performs a number of tasks. First, the SCU acquires and stores a full resolution "snapshot" X of the event. A snapshot comprises a full frame of video taken from a camera observing the scene where the intrusion has occurred. Referring to FIG. 4A, this figure represents a full frame of video obtainable from a camera 22. The frame size is, for example, 512*480 pixels. In the processing operations performed by processor 30, the full frame image of a scene is processed. Snapshots of the scene are taken at predetermined intervals during an intrusion. Referring to FIG. 5, a time line is represented for the frame rate at which images are obtained by a camera 22. This frame rate is 15 Hz. At time $T_0$, a frame $F_n$ is created. Thereafter, at intervals of one-quarter second, for example, the frame created at the time is used to produce a snapshot X1–Xn. Thus, from time $T_0$ to time $T_1$, snapshots are created for the respective frames $F_{n+1}$, $F_{n+2}$, $F_{n+3}$, and $F_{n+4}$. Snapshots are taken from the frames produced by whichever camera is selected at a particular time. All of these snapshots are stored in a snapshot buffer 40. When an intrusion is detected, the snapshot for that event is first authenticated and then sent to the central station. Image authentication is performed at a section 42 of the video processor in accordance with the teachings of co-pending application Ser. No. 08/757,838. The authenticated snapshot is now data compressed, as indicated at 44, and supplied to the central station through a video output 46 of the SCU, and TA 20.

In addition to transmitting the snapshot, the SCU alerts AU 16 which, in turn, actually communicates the alarm to the central station. In addition, the AU, through TA 20, takes control of the entire available bandwidth for communication between the SCU and the central station so the SCU can provide video images to a workstation 106 at the central station for viewing by the operator. As indicated in FIG. 1, communications between the SCU and TA is via an ethernet channel as is well-known in the art. Ethernet channels are similarly employed at the central station. Communications between premises F and the central station is by ISDN line, a telephone line providing 128 kbps of bandwidth. The ISDN line provides one or two 64K "B" channels and up to six "D" channels providing up to an additional 16K of bandwidth, all as is well known in the art. When necessary for the video security system to command the full bandwidth of an ISDN line, the TA terminates all other line usage so to make the full available bandwidth of the ISDN line available to the alarm system so snapshots, compressed video, live video, and audio can be rapidly communicated to the central station operator and the operator's commands can be sent to the SCU. After an intrusion is detected, processor 30 of the SCU continues image processing in order to confirm or cancel the alarm. If an intrusion is confirmed by the continued processing performed by processor 30, SCU 12 compresses subsequent frames of video and stores them. In addition, the SCU continues to periodically take and store full resolution snapshots for transmission to the central station once the communication path to the central station is established.

Referring to FIG. 6, AU 16 includes a pair of power/sensing lines 202a, 202b across which the various sensors S1–S3 are connected in parallel. The sensing output of each sensor is supplied to an interface 204 of the AU. The AU further includes a processor/memory section 206 which processes inputs from the sensors S1–S3, as well as the indication from the motion sensor formed by the cameras and SCU. Section 206 has a plurality of memory segments, one for each sensor. Anytime one of the sensors is triggered, an appropriate portion of the memory is updated, and an alarm signal is provided through a communications interface 208 to TA 20.

AU 16 interfaces with controller 28 of the SCU through an interface 210. The indication of a confirmed intrusion is provided to the AU through this interface. The AU memory 206 includes a segment for the SCU; and, in particular, each camera 22 providing video images processed by the SCU. This segment allows the various classes of detected causes of motion observed by each camera to be registered in the memory. Thus, the memory can store each incidence of detection by each camera and can store information for all of the classes of causes of motion, including those such as human (H), animal (A), and unknown (U), which, for a specific monitoring situation, will result in the AU generating an alarm.

Figure 7:
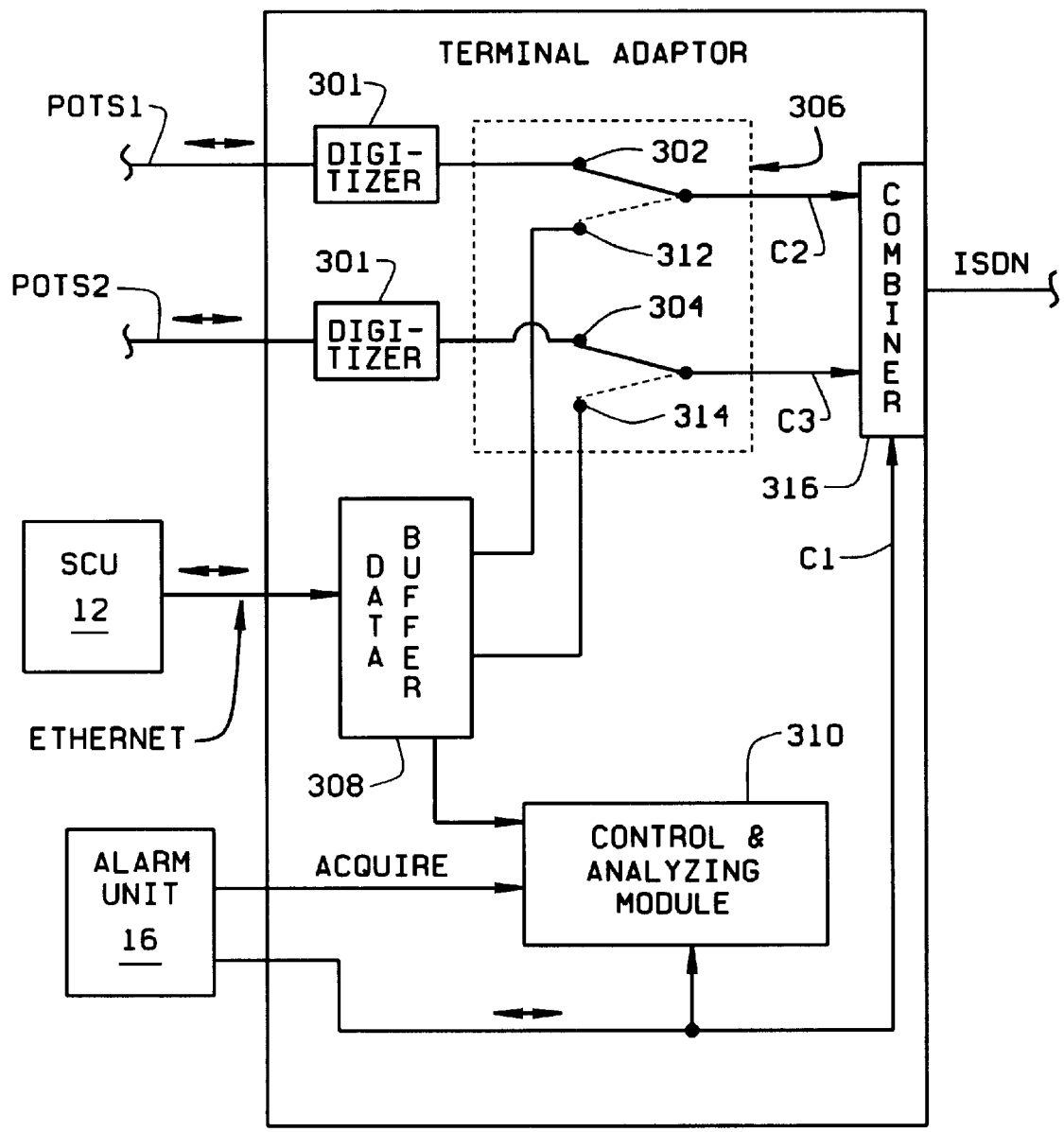
FIG. 7 is a block diagram of a terminal adapter of the security system.

As shown in FIG. 7, terminal adapter 20 connects to both SCU 12 and AU 16. The AU unit has a constant communications path or channel C1 which goes from the AU, through TA 20, to central station CS. In addition, two telephone lines POTS 1 and POTS 2 are also routed through the terminal adapter. Both of these lines are connected through digitizing modules 301 to respective contacts 302, 304 of a two position switch 306 which, while an electronic switch, is shown in FIG. 7 as a ganged switch. On the other side of the switch, are two "B" channels respectively designated C2 and C3. The video output of SCU 12 is routed over an ethernet line to a data buffer 308 of the TA. During normal operation, traffic flow between the premises and central station comprises two-way traffic over the ISDN. Contact arms of switch 306 are in their solid line position shown in FIG. 7, and both of the POTS line are available for whatever usage the operator of the premises wishes to put them.

When an alarm condition arises, TA 20 operates to seize control of the two "B" channels to provide a combined ISDN communications channel having sufficient bandwidth for video from the SCU to be transmitted to the central station. For this purpose, the TA includes a control module 310 whose function is to acquire and maintain control of the POTS lines. Module 310 initiates its acquisition function in one of three ways. First, AU 16 may provide an acquire input directly to the module. On receipt of the input, module 310 causes the ganged contact arms of switch 306 to move from the respective contacts 302, 304, to new contact positions 312, 314. These are the dashed line positions shown in FIG. 7. Now, the communication lines C2 and C3 are connected to data buffer 308. Video signals transmitted from the SCU now flow through the ethernet connection at the premises into data buffer 308, through the buffer and switch 306 to lines C2, C3. A second way module 310 knows to seize control of the channels is by monitoring the data on line C1. When the module recognizes predetermined data (such as a telephone number or an embedded command) from its analysis of the data on line C1, it will seize control of the POTS lines. The third of way module 310 knows to seize control is to monitor data being inputted into buffer 308 from the SCU. When the module recognizes predetermined data from its analysis of the buffered information; it, again, seizes control.

Communications lines C2 and C3 are combined with line C1 at a combiner module 316 of TA 20. The lines are combined to form an ISDN communication path the use of which is controlled by the TA for so long as the alarm condition is being investigated. During this period, snapshots, compressed video, live video, and audio is sent back and forth over this path. When the alarm condition ends, module 310 operates to release lines C2 and C3 back to the respective POTS lines.

Communications through the ISDN line, by utilizing two "B" channels, offers 128 Kbps for video transmission. Using an H.261 video compression system, an uprate of 15 frames/sec using a CIF formatted (352×288) video can be achieved. The task of a system operator O at the central station is readily achieved if SCU 12 provides a fast update rate with good quality video, within the channel bandwidth allocated, and with little to no latency. H.261 is a compression standard that enables the desired level of performance to be achieved over an ISDN line. With the use of more sophisticated compression schemes, around the H.261 ITU standard, for example, SCU 12 will provide comparable performance over the POTS lines.

Once established, video images are continuously compressed and relayed to the system control over the ISDN line. This is done with minimum latency, at a fast frame rate, and with as good a quality as is permissible by the communication channel bandwidth and the requisite compression required. Minimizing latency is important because apart from SCU 12 periodically storing full resolution snapshots of the frame size shown in FIG. 4A, operator O can instruct the SCU to take snapshots. Upon receipt of snapshots from the SCU, the operator's task is to confirm the presence of an intruder and relay the information to the necessary authorities for them to investigate.

All video communications between SCU 12 and the central station are stored for later analysis at video server 102. As noted, by the time a communications path is established between the SCU and the central station by TA 20, the SCU will have stored a number of snapshots. Upon request by the operator, these snapshots are transmitted via communications channel C through to a workstation 106 at the central station. Here they can be arranged in a mosaic pattern by the operator for his or her viewing. After viewing the snapshots, the operator selects one or more of the images for transmission from SCU 12 to the system control. This new transmission of images is at a slower rate using lossless compression techniques and full RS170 resolution. This is useful for identification purposes, and for confirmation of details to the police. Eventually all snapshots will be transferred from the SCU over channel C using lossless compression. Each snapshot is authenticated again using the process described in co-pending application Ser. No. 08/757,838. In addition to being authenticated at the source (i.e., SCU 12), each image is further authenticated upon reception at the central station so the authenticated images can be later used for prosecution purposes. The additional authentication is again in accordance with the teachings of co-pending application Ser. No. 08/757,838, and is discussed in co-pending application Ser. No. 08/904,509.

Figure 8:
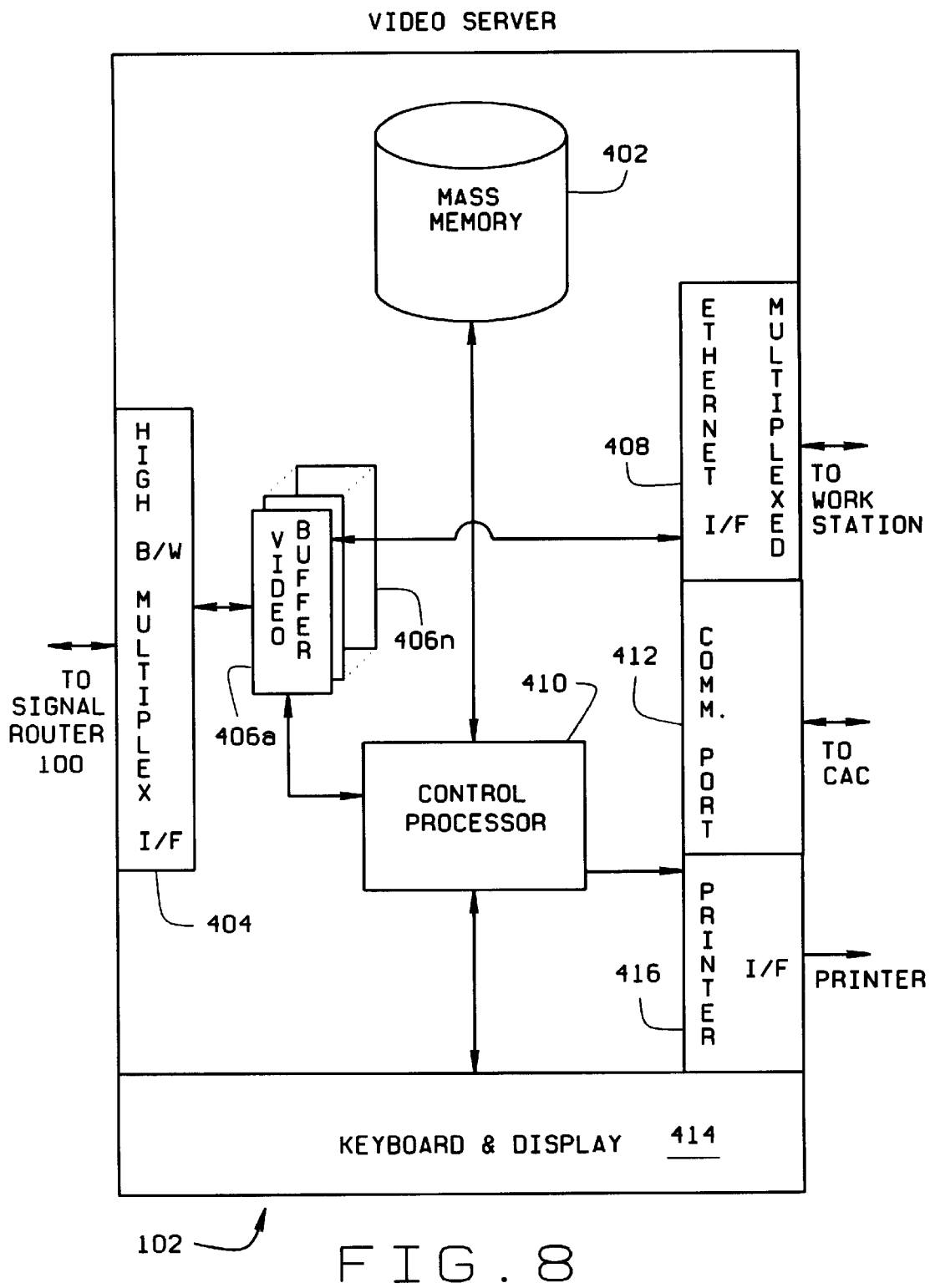
FIG. 8 is a block diagram of a video server of the security system.

Referring to FIG. 8, video server 102 includes a mass memory 402 in which is stored video and interleaved audio signals supplied by the SCU through the AU and TA. The video server is connected to signal router 100 through a high bandwidth, multiplexed interface connection 404. Video and audio signals transmitted from the various monitored premises are first buffered in a buffer 406a–406n. The signals are then routed through the video server to one of the workstations 106 through a multiplexed ethernet interface 408. Or, if so commanded by a control processor 410, the signals are routed to memory 402 for storage. In addition to storing video and audio signals from a current intrusion, memory 402 further provides a storage medium for archival video and audio signals relating to previous intrusions which occurred at the various premises.

Control processor 410 is connected to central alarm computer 104 through a communications port 412 for routing commands from the CAC to the video server to be used to control routing of video and audio signals to a workstation selected by the CAC. The video, whether buffered or live, snapshots, thumbnails, or archival, is routed to the selected workstation over an ethernet. In addition, audio from the workstation being sent back to the monitored site is routed through the video server to signal router 100 for transmission back to a SCU 12 at the site. A keyboard and associated display 414 enables an operator to also control operation of the video server; for example, to purge memory 402. Finally, the central processor can route video and audio information to a printer interface 416 for recordation of the video and audio on appropriate media.

Figure 9:
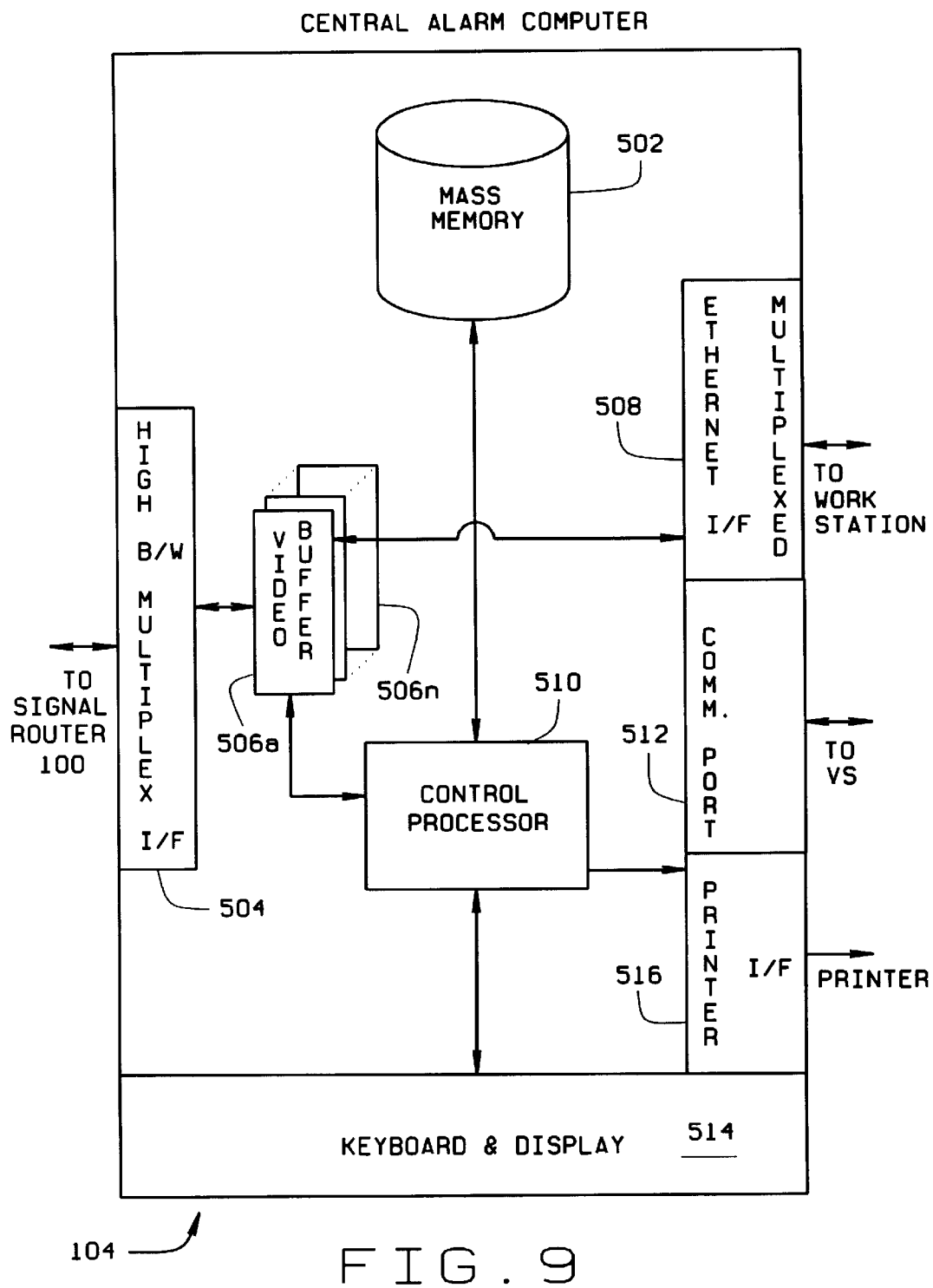
FIG. 9 is a block diagram of a central alarm computer of the security system; and, FIG. 10 is a representation of a workstation at which video, audio, and pertinent data is displayed for a system operator.

Referring to FIG. 9, central alarm computer 104 has a mass memory 502 in which is stored data relating to the various premises being monitored. The computer is connected to signal router 100 through a high bandwidth, multiplexed interface connection 504. An alarm signal from a monitored site is supplied to the computer through this interface, and command signals by which video and audio signals relating to the intrusion are transmitted to the central station emanate from the computer and are transmitted to the site from the computer. Intrusion site data (site address, which sensors have been triggered, etc.) received at the computer is first buffered in a buffer 506a–506n. The data is then routed through the computer server to one of the workstations 106 through a multiplexed ethernet interface 508. Or, if so commanded by a control processor 510, the data is sent to memory 502 for storage. In addition to storing data relating to a current intrusion, memory 502 also stores data relating to previous intrusions which occurred at the various premises.

Control processor 510 is connected to video server 102 through a communications port 512 so commands from the computer can be routed to the video server to control routing of video and audio signals from the video server to a workstation selected by the computer. The video, whether buffered or live, snapshots, thumbnails, or archival, is routed to a selected workstation over an ethernet. One of the functions of computer 104 is to monitor the availability of the various workstations at the central station so to provide an alarm indication and accompanying video, audio, and data to an available workstation. Further, commands from a system operator are sent back to a monitored site through the computer. A keyboard and associated display 514 enables an operator to also control operation of the computer to; for example, to purge memory 502. Finally, the central processor can route incoming and stored data to a printer interface 516 for recordation of the data in appropriate media.

Figure 10:
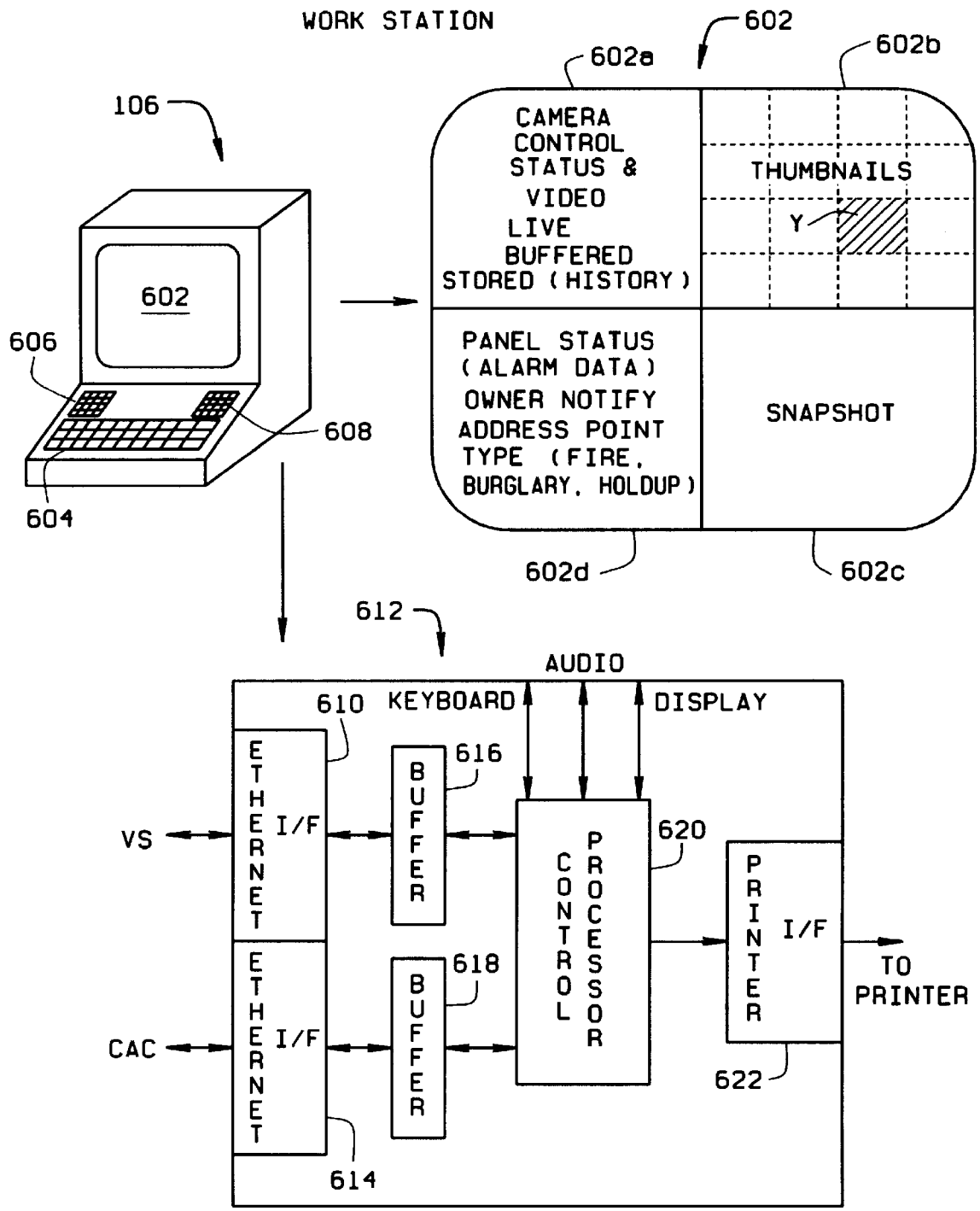

Workstation 106, as shown in FIG. 10, includes a video display 602, keyboard 604, speaker 606, and microphone 608. Display 602 is divided into four quadrants labeled 602a–602d. In quadrant 602a, status information for the cameras 22 at the premises is displayed. This includes information as to which camera is providing video from the site, for example. Information is also displayed in this portion of the screen as to the type of video being viewed; that is, is the video live, buffered, or stored or archival video.

Figure 4B:
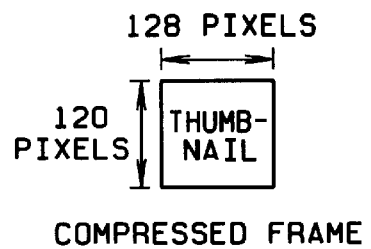

In quadrant 602b, the operator has the ability to display up to sixteen thumbnails (i.e., the compressed frames of video shown in FIG. 4B). The operator can place these images in any order he wishes so to create a desired pattern or mosaic of the frames. The images displayed also can be not only current video, but stored video as well. This allows the operator to determine, for example, if an intruder has been previously detected on the premises (e.g., an employee, guard, etc.). As indicated at Y, the operator can highlight one of the thumbnails for which he wishes to see full frame video (a snapshot). The snapshot is then displayed in quadrant 602c. It will be understood that the thumbnails and snapshots are provided by, or through the video server using an ethernet connection between the video server and workstation as indicated at 610 of the control portion 612 of the workstation.

In the remaining quadrant 602d, relevant site data is displayed. This information is obtained through the central alarm computer and, again, can be both current and stored data. The workstation is connected to the CAC through a second and separate ethernet connection 614. Information displayed in quadrant 602d includes such information as:

who owns or operates the premises where the intrusion is detected;

the address of the premises;

who should be notified in the event of an alarm (both from the authorities and owner/operator personnel);

the type of alarm (intrusion, fire, burglary, holdup);

the point of the alarm.

For the latter, those skilled in the art understand that sensors such as S1–S3, are installed in sensing loops routed through the premises, and that a point represents a particular location in the premise served by a particular device or loop. Point identification information thus identifies that location for the operator.

Video, audio, and data routed to the workstation from the video server and CAC are respectively buffered as indicated at 616 and 618. The information is then routed to the display through a control processor 620. It will be understood that the transmission path is a two-way path so, for example, operator commands can be sent from the workstation, through the CAC, VS, back to the SCU at the intrusion site. Or that video and audio information can be sent to the video server for storage in memory 402. Information which is to be printed, or of which a record is to be made, is routed from the control processor to a printer interface 622 for a record to be made in the appropriate media.

As shown in FIG. 2, images from cameras 22, in addition to being supplied to snapshot buffer 40 are also supplied to a video compression module 50. A compressed image or "thumbnail", as shown in FIG. 4B, is made by taking, for example, every fourth pixel of a full frame image of FIG. 4A. Thus, a thumbnail has a pixel size of 128*120, so it is $\frac{1}{16}$ the size of a snapshot. Alternatively, rather than taking every fourth pixel, a snapshot can also be created using pixel averaging techniques to create a snapshot of the same 128*120 size. From module 50 compressed images are either sent directly (i.e., live) through video output 46, TA 20, and the communications channel to the central station, or the compressed images are stored in a compressed video buffer 51 for subsequent transmission. When an intrusion is detected, video compression immediately begins, and the storage capacity of buffer 51 is sufficient to store several seconds of compressed video. The capacity of the buffer is sufficient so that no images are lost between the time the intrusion is detected and TA 20 establishes the full bandwidth communications channel between the SCU and the central station. Live video is sent to the system control when, for example, the operator is doing a remote guard tour of the premises.

In addition to the video cameras 22, audio microphones 52 may be employed about the premises. The cameras 22 may incorporate the microphones, or the microphones may be separately installed. Audio received by the microphones is processed by an audio processing module 54 of the SCU. Audio output signals from the processing are supplied to video compression module 50 for the audio to be compressed. The compressed video signals from the SCU are then transmitted to the system control with interlaced compressed audio, thus enabling the operator to also listen in on an intrusion as well as view it.

Once a communications path is established between the SCU and the central station, the operator can now control a number of facets of the SCU operation. For example, the operator can override a particular camera from which the video is being compressed and relayed to him, and rather obtain video from another camera. This is particularly useful when there may be more than one intrusion detected and the first detection is from an area of the premises having less priority than that where there is another detection. By being able to observe the other scene, the operator can use the SCU to monitor the detection of the intruder in the higher priority area. Again, the operator can use the pan, tilt and zoom capabilities of a camera to help him obtain better observe the scene.

What has been described is a workstation at which video, audio, and relevant data about a premises is conveniently displayed for a system operator. The workstation enables the operator to determine not only what is displayed, but the manner in which it is displayed. Processed video images including snapshots of the premises obtained from any of a plurality of cameras located about the facility are displayed. The workstation further allows the thumbnail images to arranged in any pattern (mosaic) desired by the operator and the operator can have all, or only certain images displayed. Further, live video can be shown to the operator. The workstation connects to a video server at the central location to and through which video signals from all the monitored premises are routed to the workstation. The workstation receives video (including live and stored images) and audio from the video server. The workstation also connects to a central alarm computer for acquiring data about a site, and for routing commands back to the premises at which an intrusion occurs. The workstation enables operators to work quickly and efficiently even though a large number of premises are monitored from a central station where the workstations are located.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A workstation for a security system providing video surveillance of a premises to detect intrusions of the premises comprising:

a first video display displaying status information of video equipment used at the premises to perform the surveillance;

a second video display displaying a plurality of first video images;

a third video display displaying a second video image from which one of said first video images is derived, said second video image being displayed being selected by a workstation operator from said plurality of first video images; and, a fourth video display displaying data relating to the premises and identifying the location on the premises where the intrusion occurred.

2. The workstation of claim 1 further including control means by which said operator can arrange said first video images in a selected pattern and can identify for which of said first video images said second video image is to be displayed on said third video display.

3. The workstation of claim 1 further including an audio interface means configured to play audio signals received from said security system.

4. The workstation of claim 3 wherein said audio interface means is further configured to receive audio data from said workstation operator and transmit said received audio data to said premises.

5. The workstation of claim 3 wherein said audio signals are interlaced with received video signals from said security system, said audio interface means further configured to extract said audio signals from said video signals.

6. The workstation of claim 1 wherein said plurality of first video images include scenes of said premises obtained from said video equipment used at said premises to perform surveillance.

7. The workstation of claim 6 wherein said plurality of first video images may include a combination of current scene images and archival scene images recorded at a previous time.

8. The workstation of claim 1 wherein said plurality of first video images comprises up to and including sixteen video images.

9. The workstation of claim 1 wherein said data relating to said premises includes:

data identifying an owner or operator of said premises;

data identifying an address of said premises;

data identifying personnel to be notified in the event of an intrusion into said premises;

data identifying the type of intrusion detected into said premises; and data identifying the location of said intrusion into said premises.

10. A workstation for a security system providing surveillance of a plurality of premises to detect the occurrence of at least one of a predetermined events comprising:

a first display means configured to display status information of surveillance equipment located at one of said plurality of premises;

a second display means configured to display a plurality of video images related to said one of said plurality of premises;

a third display means configured to display an enlarged video image derived from one of said plurality of video images selected by a workstation operator; and a fourth display means configured to display data relating to said one of said plurality of premises.

11. The workstation of claim 10 wherein each of said first, second, third, and fourth display means comprises a quadrant of a video display.

12. The workstation of claim 10 wherein each of said first, second, third, and fourth display means comprises an individual video display.

13. The workstation of claim 10 further including control means configured to allow said workstation operator to arrange said plurality of video images and to identify said one of said plurality of video images for display on said third display means.

14. The workstation of claim 10 further including an audio interface means by which said workstation operator can transmit and receive audio data to and from said one of said plurality of premises.

15. The workstation of claim 1 wherein said one of said predetermined events is an intrusion within said premises.

16. The workstation of claim 1 wherein said one of said predetermined events is a fire within said premises.

* * * * *